United States Patent
Berlin et al.

(10) Patent No.: US 9,600,423 B2
(45) Date of Patent: Mar. 21, 2017

(54) PERIODIC ACCESS OF A HARDWARE RESOURCE

(75) Inventors: Kimon Berlin, Ft Collins, CO (US); Stephen G Uhlmann, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 20 days.

(21) Appl. No.: 14/385,258

(22) PCT Filed: Jul. 26, 2012

(86) PCT No.: PCT/US2012/048278
§ 371 (c)(1),
(2), (4) Date: Sep. 15, 2014

(87) PCT Pub. No.: WO2014/018037
PCT Pub. Date: Jan. 30, 2014

(65) Prior Publication Data
US 2015/0033236 A1    Jan. 29, 2015

(51) Int. Cl.
*G06F 13/10* (2006.01)
*G06F 9/44* (2006.01)
*G06F 13/24* (2006.01)
*G06F 9/48* (2006.01)

(52) U.S. Cl.
CPC .......... *G06F 13/102* (2013.01); *G06F 9/4411* (2013.01); *G06F 9/4812* (2013.01); *G06F 9/4887* (2013.01); *G06F 13/24* (2013.01); *G06F 2209/485* (2013.01)

(58) Field of Classification Search
CPC ..... G06F 2009/45579; G06F 2009/485; G06F 8/67; G06F 9/4411; G06F 9/4887; G06F 9/4812; G06F 2212/1041; G06F 13/102; G06F 13/24
See application file for complete search history.

(56) References Cited

U.S. PATENT DOCUMENTS

| | | | |
|---|---|---|---|
| 5,901,312 A * | 5/1999 | Radko ..................... | G06F 9/468 718/1 |
| 6,560,659 B1 * | 5/2003 | Tobias .................. | G06F 13/102 710/10 |
| 6,587,898 B1 | 7/2003 | Larson et al. | |
| 7,546,487 B2 | 6/2009 | Marisetty et al. | |
| 7,596,687 B2 | 9/2009 | Sultenfuss et al. | |
| 9,098,354 B2 * | 8/2015 | Arimilli .................... | G06F 9/54 |

(Continued)

OTHER PUBLICATIONS

Intel Integrated Graphics Device, OpRegion Specification, Driver Programmer's Reference Manual, Oct. 1, 2008, Revision 1.0, pp. 1-134, Intel Corporation, Available at: <intellinuxgraphics.org/ACPI_IGD_OpRegion_%20Spec.pdf>.

(Continued)

*Primary Examiner* — Lewis A Bullock, Jr.
*Assistant Examiner* — Jacob Dascomb
(74) *Attorney, Agent, or Firm* — Law Office of Robert C. Sismillich (57) ABSTRACT

An example includes periodic access of a hardware resource of a computer by instructions in firmware of the computer that are executed by an interpreter in the context of the operating system without a driver. The access occurs in response to a periodic interrupt generated by a timer.

10 Claims, 5 Drawing Sheets

(56) References Cited

U.S. PATENT DOCUMENTS

| | | | |
|---|---|---|---|
| 2003/0097496 A1* | 5/2003 | Gabryjelski | G06F 13/102 |
| | | | 710/15 |
| 2004/0243534 A1* | 12/2004 | Culter | G06F 9/4411 |
| 2006/0020940 A1* | 1/2006 | Culter | G06F 9/5077 |
| | | | 718/100 |
| 2006/0248282 A1 | 11/2006 | Rostampour et al. | |
| 2007/0008582 A1* | 1/2007 | Cheng | G06F 13/102 |
| | | | 358/1.15 |
| 2007/0094673 A1 | 4/2007 | Hunt et al. | |
| 2008/0148033 A1* | 6/2008 | Sumner | G06F 8/31 |
| | | | 713/1 |
| 2008/0282321 A1* | 11/2008 | Hecht | G06F 21/604 |
| | | | 726/1 |
| 2009/0313441 A1 | 12/2009 | Mochida et al. | |
| 2010/0153765 A1* | 6/2010 | Stemen | G06F 1/3203 |
| | | | 713/340 |
| 2011/0296409 A1* | 12/2011 | Lo | G06F 8/71 |
| | | | 718/1 |
| 2012/0011506 A1* | 1/2012 | Iwamatsu | G06F 1/3215 |
| | | | 718/1 |
| 2012/0124663 A1 | 5/2012 | Russo et al. | |

OTHER PUBLICATIONS

International Search Report and Written Opinion, International Application No. PCT/US2012/048278. Date of Mailing: Mar. 26, 2013, pp. 1-7.

* cited by examiner

PERIODIC ACCESS OF A HARDWARE RESOURCE

BACKGROUND

Computer systems typically execute an operating system. An operating system ("OS") is a set of computer instructions that allows application programs to be invoked and run, provides services to these programs, and manages computer hardware resources and access to them by the programs.

Some of the hardware resources may be built into the computer itself (for example, in the chipset or on the motherboard of the computer). Some of these resources are controlled by device drivers that are (or become) installed in the operating system. These drivers allow the operating system and application programs to access the hardware resources without having detailed knowledge of how the hardware resources are implemented in the computer's hardware architecture, something which can vary from model to model of computer, even from the same computer vendor.

Operating systems are used in laptop, desktop, and workstation computers, and also in supercomputers, web servers, and in most electronic devices that include an embedded processor, including cell phones and video game consoles among others. There are a variety of operating systems in use today, including several versions of Windows from Microsoft, and one or more versions of Linux from each of many different Linux providers, as well as other operating systems.

Each computer also includes firmware that initializes (or "boots") the computer by loading the operating system into memory when the computer is powered on. This firmware, commonly referred to as the BIOS (Basic Input/Output System), also presents the hardware resources and certain input/output ("I/O") functions of the computer to the operating system. The firmware is usually tailored to the hardware architecture of the computer such that it presents its resources and functions to the operating system in an industry-standard manner. Such industry standards include the older de facto BIOS standard, a newer standard such as the Extensible Firmware Interface (EFI), or other standards. Thus the firmware allows a particular code distribution of a particular version of an operating system to run on a variety of different models of computer despite the differences in hardware architectures among the various computer models.

DETAILED DESCRIPTION

As noted in the Background section, the firmware in a computer allows a particular code distribution of a particular version of an operating system to run on a variety of different models of computer despite the differences in hardware architectures among the various computer models. The firmware also allows a variety of different types and versions of operating systems to run on the same computer. For example, the same model of computer may be able to run Microsoft Windows XP, Microsoft Windows 7, and any of a variety of different Linux-based OS distributions from different vendors and organizations, all of which support the BIOS standard for accessing the hardware resources of the computer.

However, in many cases device drivers, rather than BIOS functions, are used to access the hardware resources. The device driver approach may, in some situations, be chosen due to performance requirements. One such situation is the case of a hardware access operation that takes a relatively long time (e.g. greater than one to three milliseconds) to complete. One example of such a lengthy hardware access operation is the read and/or write of a relatively large block of memory addresses of the hardware resource.

Because a device driver runs in the context of the OS, the OS can interrupt the driver to allow the servicing of higher-priority events which occur during the time the hardware access operation is being performed. However, the firmware does not run in the context of the OS, but rather in a different context. One such different context, applicable to a variety of hardware including, for example, Intel, AMD, and Nvidia chipsets, is System Management Mode (SMM), which utilizes a System Management Interrupt (SMI) to temporarily transfer complete control of the computer to the firmware. In other words, the OS is suspended while a BIOS function is being executed to perform a hardware access operation. As a result, higher-priority events that occur during the execution of the BIOS function cannot be serviced until after execution of the BIOS function has been completed. As a result, the computer can malfunction due to the inability to promptly service these higher-priority events. For example, network traffic packets can be missed, or frames in a video or audio player can be dropped, among other malfunctions. The difference in execution context between the OS and the BIOS thus limits the situations in which firmware code executed in the BIOS context can be used to access hardware resources. In order to avoid real-time latency effects in hardware access functions or routines, it can be advisable to implement such code in a device driver which does operate in the context of the OS, allowing any higher-priority events which occur during execution of the device driver to be promptly serviced. For example, in the case of the read and/or write of the relatively large block of memory addresses of the hardware resource discussed above, the higher-priority event may be serviced partway through the reading and/or writing of the relatively large block of memory addresses, with the reading and/or writing resuming from the address at which it left off when it was suspended to service the higher-priority event.

However, a disadvantage of a driver-based approach is its complexity relative to a firmware-based approach. In most modern computers, the firmware code is stored on a flash memory device that can easily be reprogrammed in situ in the computer to add or modify code that accesses the hardware resource. And as mentioned above, once the firmware is updated, the updated routines can be used by all of the different OS distributions that run on the computer. But if that new or modified code is instead provided as a driver, a different release of driver code will be used, and supported, for every different OS distribution that runs on the computer. This disadvantageously adds complexity for both the computer vendor (in providing many different driver versions), and the end user (in updating the OS to install the driver). A simpler approach is desirable.

Referring now to the drawings, there is illustrated an example of a computer constructed in accordance with the present disclosure in which a timer in the computer periodically causes firmware-based code that accesses a hardware resource to be executed in the context of the operating system, which lacks a driver for the hardware resource, and thus the hardware resource is accessed without the use of a driver.

As defined herein and in the appended claims, code that is "executed (or run, or performed) in the context of the operating system" shall be broadly understood to mean code whose execution is scheduled or invoked by the operating system, and during whose execution the operating system is not suspended.

Also defined herein and in the appended claims, a "driver" shall be broadly understood to mean a portion of privileged operating system code that directly accesses hardware resources on behalf of other less privileged portions of OS code, using a predefined access interface. Operating system code that runs at driver level is privileged and thus can access hardware resources directly, while operating system code that runs at user level is unprivileged and cannot access hardware resources directly.

Figure 1:
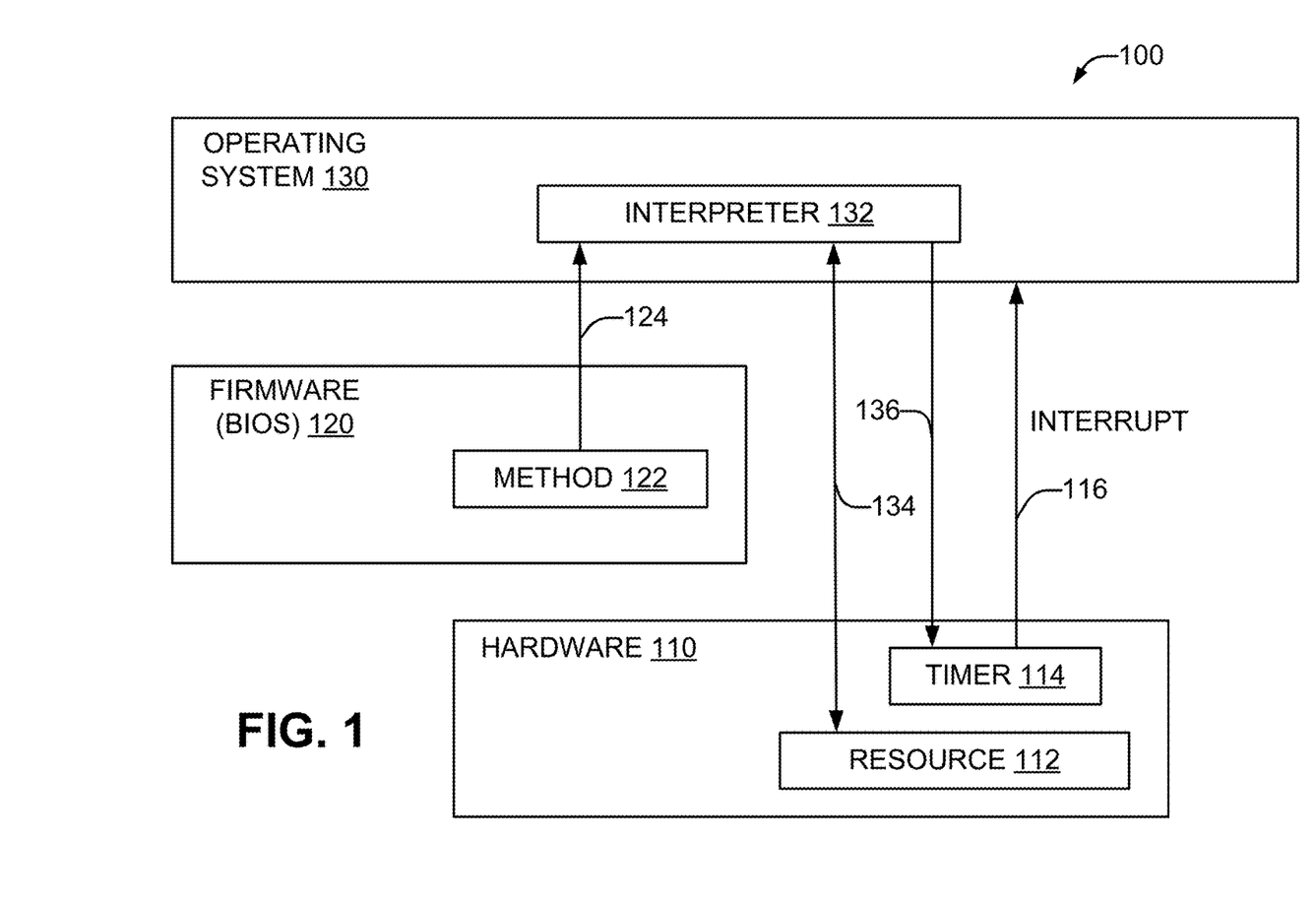
FIG. 1 is a schematic representation of a computer having method code instructions resident in firmware that are executed by an interpreter in the context of an operating system to access a hardware resource in accordance with an example of the present disclosure.

Considering the computer in more detail, and with reference to the schematic representation of FIG. 1, a computer 100 includes hardware 110, firmware 120 that may in some examples be a BIOS, and an operating system 130.

The hardware 110 includes at least one hardware resource 112. As defined herein and in the appended claims, a "hardware resource" shall be broadly understood to mean a hardware device that may be programmatically accessed via one or more hardware registers. Each register may be implemented as an I/O-mapped I/O port, a memory-mapped I/O port, or a memory address. In some examples, the hardware device may be disposed on a motherboard of the computer 100, or within a processor chipset of the computer 100.

The hardware 110 also includes at least one timer 114. The timer 114 may be a watchdog timer. The timer 114 may be a discrete element of the hardware 110, or may be implemented within a component of the chipset of the computer 100. The timer 114 can be configured to periodically generate one or more output signals. In some examples, the timer 114 can be configured programmatically. The timer 114 may be configured to generate the output signals at a regular interval, or at a varying interval. The output signal of the timer 114 is arranged in the computer 100 to generate an interrupt signal 116 that is serviced by the operating system 130.

The operating system 130 includes an interpreter 132. As defined herein and in the appended claims, an "interpreter" shall be broadly understood to mean a computer program that executes (or performs) instructions written in a particular programming language. The interpreter 132 operates in the context of the operating system 130, and under control of the operating system 130. The operating system 130 is configured such that, when the interrupt from the timer 114 is received, the operating system 130 schedules the interpreter 132 to run. Scheduling the interpreter allows it to be run at an appropriate time and at an appropriate priority relative to other tasks managed by the operating system 130. When the interpreter 132 runs, it interprets the instructions of method code 122, and performs the corresponding actions specified by the method code instructions 122 so as to access 134 the hardware resource 112. The method code instructions 122 are not provided as part of the operating system 130, but rather as part of the firmware 120. However, the processor of the computer 100 does not directly execute the method code instructions 122 as it typically does for other functions or routines of the firmware 120. Instead, the processor executes the interpreter 132, which in turn accesses or obtains 124 the instructions of method code 122. Put another way, the instructions contained in the method code 122 are not directly executed by the processor, but these instructions define the actions and operations that are taken by the interpreter 132 to perform the actions specified by the method code 122. As a result, the method code instructions 122 are not executed in the context of the firmware 120. Instead, because the interpreter 132 is interpreting the method code instructions 122 and performing the instructions specified by the method code 122, the method code 122 is executed in the context of the operating system 130. Furthermore, because the operating system 130 is not suspended while the method code instructions 122 are being executed, the operating system 130 can, if appropriate, temporarily suspend execution of the interpreter 132 (and thus the method code 122), in order to service higher-priority tasks. This advantageously allows the computer 100 to avoid the type of system malfunctions that have been previously discussed and which result from suspension of the operating system 130. For example, network traffic packets can be captured without loss, and video or audio players can avoid dropped frames, because execution of the interpreter 132 can be suspended in order to process these higher-priority activities.

The timer 114 is configured to periodically generate the interrupt 116 to the operating system 130 that causes the operating system 130 to schedule the interpreter to execute particular method code instructions 122 in the context of the operating system 130 in response to the interrupt 116. This configuration of the timer 114 may be performed by the method code instructions 122 and/or by different method code instructions (not shown) in the firmware 120.

The hardware resource 112 may be any of a variety of different hardware devices. In one example, the hardware resource 112 may be a component that is accessed on a periodic basis in order to maintain proper operation or functionality of the component. For example, the operation of a certain component may degrade or fail unless it is accessed within a certain time after its last prior access. This behavior may be inadvertent, and due to a defect in the component. In this case, the timer 114 can be configured to periodically generate the interrupt 116 before the certain time is exceeded, and the method code 122 can specify the instructions for the interpreter 132 to properly access the component to maintain its proper functionality. When used for such a purpose, as well as in other situations with other types of hardware resources, the method code instructions 122 may not cause any data from the hardware resource 112 to be returned to the operating system 130.

In another example, the hardware resource 112 may be a source of information or data about system operation, such as system performance or system health, that is obtained periodically. For example, the information or data can represent a measure of the types and amounts of activities being performed by the computer 100. As another example, the information or data can represent a measure of the error rate encountered by the resource 112, such as for example with regard to network traffic. When used for these and similar purposes, the method code instructions 122 typically causes the information or data from the hardware resource 112 to be returned to the operating system 130, which can subsequently present it to a user (e.g. on a display), or use it to automatically make adjustments that optimize system performance or health.

Figure 2:
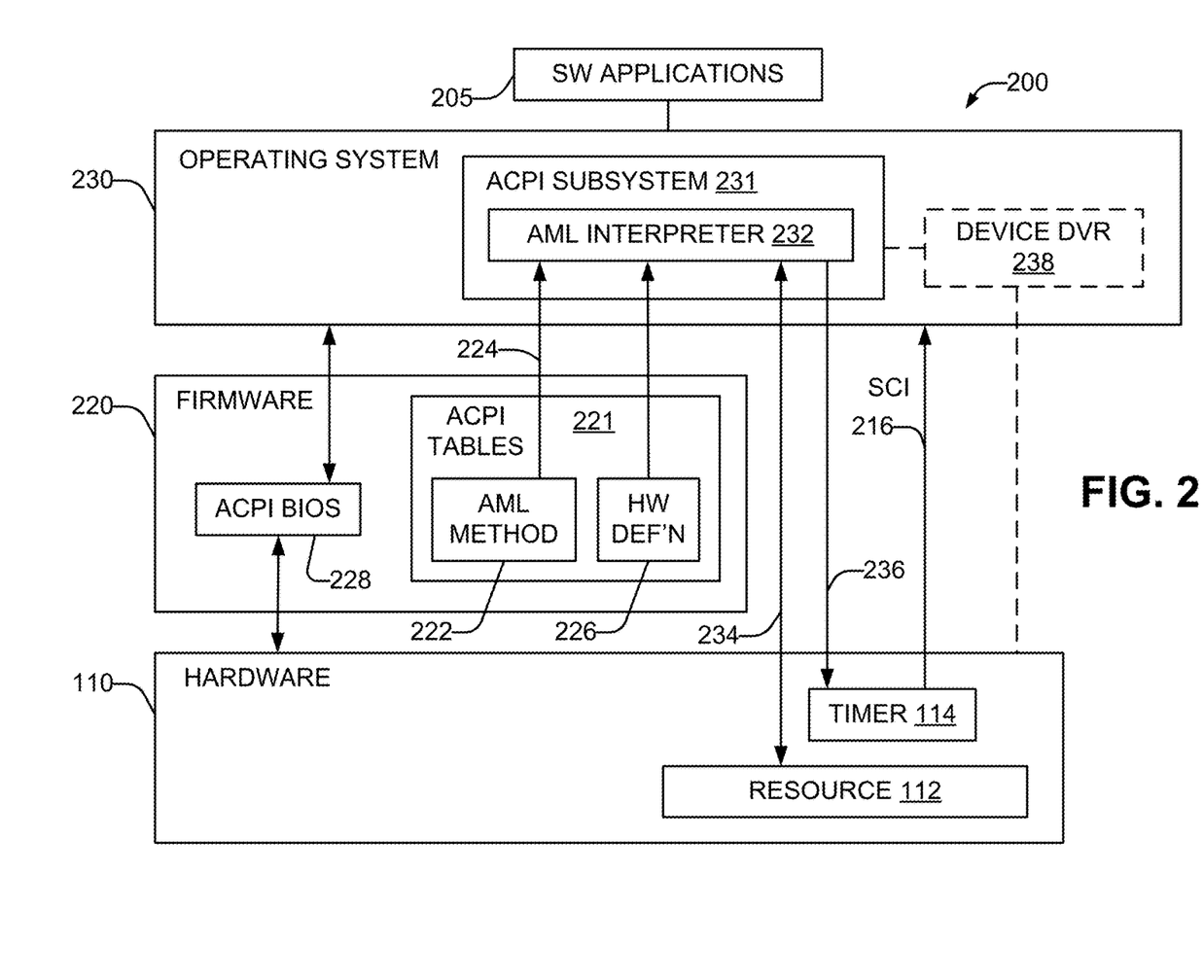
FIG. 2 is a schematic representation of another computer having method code instructions resident in firmware that are executed by an interpreter in the context of an operating system to access a hardware resource, where the computer implements the ACPI standard, in accordance with an example of the present disclosure.

Considering now another computer, and with reference to the schematic representation of FIG. 2, a computer 200 includes hardware 110, firmware 220 that is typically considered a BIOS, and an operating system 230.

The hardware 110 includes a hardware resource 112 and a timer 114 that are the same or similar to those described heretofore with reference to FIG. 1.

An operating system 230 supports the execution of software applications 205, which utilize the facilities provided by the operating system 230. The operating system 230 includes an ACPI subsystem 231 in accordance with the Advanced Configuration and Power Interface Specification standard. The current version of this standard is Revision 5.0, dated Dec. 6, 2011. Many computer manufacturers have implemented this standard in the firmware 220 of their computers 200, and many operating system vendors in their operating system 230. The standard is directed to hardware discovery and system configuration, and power management, particularly for hardware devices included on the motherboard of the computer. ACPI brings these under the control of the operating system (known as "operating system-directed configuration and power management", or "OSPM"), as opposed to prior BIOS-based techniques which relied on firmware to determine power management and configuration policy.

The ACPI standard defines certain system, device and processor states. State transitions occur in response to the occurrence of hardware power management events, typically performed or initiated by a user, that communicate a desired power state to the computer. For example, the act of raising the lid of a laptop computer can indicate that the user intends to interact with the computer and thus in response, for example, the system may be powered to a working state where the display is illuminated, the keyboard and mouse are activated, the processor is fully in the operating state, etc. The act of closing the lid can be configured to indicate that the user has finished using the laptop for the time being and thus, for example, the display may be turned off, the keyboard and mouse powered down, the processor put into a sleep state that consumes less power, etc. The act of pressing a power button on the computer can indicate that power can be removed from almost all of the components of the computer (except, at a minimum, from the power button itself so that the computer can be turned back on when the user presses the button again). Thus code that implements a particular power management operation is executed in response to the hardware power management event that occurs. At least a portion of that code in provided in firmware, although the code is executed under control of, and in the context of, the operating system.

Up to now, the use of ACPI has been limited to hardware configuration and power management applications, and to the handling of hardware power management events which occur on an event-driven basis. For example, ACPI may be used to indicate the occurrence of a power management-related thermal event, such as a temperature threshold being crossed, or a fan having stalled. ACPI may be used during the initialization of the operating system to configure the hardware. However, ACPI has not previously been used to perform operations on a time-driven or periodic basis other than for hardware configuration and power management purposes. In one example, ACPI has not previously been used to periodically (through the use of a timer) access a hardware device or resource.

Returning now to the computer 200, the ACPI subsystem 231 provides core software that is configured to communicate and interoperate with the ACPI-compatible portions of the firmware 220. In some examples, the ACPI subsystem 231 may be implemented as ACPI Component Architecture (ACPI-CA) software. The ACPI subsystem 231 includes an ACPI machine-language (AML) interpreter 232 that operates in a similar manner as has been described for the interpreter 132 (FIG. 1). The ACPI subsystem 231, including the AML interpreter 232, operates in the context of the operating system 230, and under control of the operating system 230.

The firmware 220 includes ACPI-compatible portions, such as ACPI tables 221 and an ACPI BIOS 228. The ACPI BIOS 228 performs basic low-level control operations on the hardware 110, particularly motherboard hardware. The ACPI BIOS 228 has code that assists with booting the computer 200, and also with putting it into sleep mode or waking it up from sleep mode. This code is executed in the context of the firmware 220, either before the operating system 230 is initialized or while it is suspended.

The ACPI tables 221 define and describe various elements of the hardware 110, such as the hardware resource 112 and the timer 114, that can be managed through ACPI. The ACPI tables 221 include hardware definition data 226 that describes at least one hardware element, and at least one associated ACPI machine language (AML) control method 222 usable to access the corresponding hardware element. An AML control method 222 has machine-independent byte-code instructions that are executable by the AML interpreter 232 to access the hardware elements, such as hardware resource 112, and perform hardware management operations. The ACPI tables 221 may be accessed during the boot-up process of the computer 220, or at a later time.

The hardware definition data 226 provides a level of abstraction for the various elements of the hardware 110. It tells the ACPI subsystem 231 information about how various hardware resources of the particular computer 220 can be accessed. In this manner, the ACPI subsystem 231, including the AML interpreter 232, can access these hardware resources without having to know the particular architecture details of the computer 220 on which it is installed, which can vary from computer model to computer model.

The timer 114 is configured to periodically generate a system control (SCI) interrupt 216 to the operating system 230. The particular SCI interrupt 216 generated by the timer 114 is associated with a corresponding AML method 222 having instructions for accessing the hardware resource 112. When the SCI interrupt 216 from the timer 114 is received, the operating system 230 schedules the AML interpreter 232 to run to service the interrupt. When the interpreter 232 runs, it interprets the byte-code instructions of the AML method 222 associated with the SCI interrupt 216 and the hardware resource 112, and performs the operations defined by the AML method code instructions 222, including accessing 234 the hardware resource 112. Since the byte-code instructions of the AML method 222 are not directly executed by the processor of the computer 200, but instead are executed by the AML interpreter 232, the AML method 222 is not executed in the context of the firmware 220, but rather in the context of the operating system 230. In cases where the AML method 222 takes a relatively long time to perform, the operating system 230 can temporarily suspend execution of the AML interpreter 232 (and thus the AML method 222), to service higher-priority tasks and avoid the type of system malfunctions that have been previously discussed.

The timer 114 is configured to periodically generate the SCI interrupt 216 to the operating system 230. The timer 114 may be configured 236 by the ACPI subsystem 231 using the same AML method 222 that accesses the hardware resource 112, by instructions of a different AML method (not shown), or by instructions of a function of the ACPI BIOS 228.

It should be noted that, although not used in the computer 200, the operating system 230 also supports the use of a one or more non-ACPI-compliant device drivers 238 (shown in dashed lines). Some device drivers 238 may be non-ACPI drivers that directly access the elements of the hardware 110. Other device drivers 238 may be ACPI-aware drivers that access the elements of the hardware 110 via the ACPI subsystem 231. It can be appreciated that, if a driver 238 were to be used to access the hardware resource 112, a different version of the driver 238 would be used for each different operating system 230 release, and for each different computer model, resulting in support complexity for both computer vendors and users. Thus it is advantageous to omit use of a driver 238 to access the hardware resource 112, and access it via an AML method 222. This advantage occurs because any operating system 230 that supports the ACPI standard (e.g. that implements the ACPI subsystem 231) can access the hardware resource 112 via the AML method 222 that is provided in the firmware 220 of the computer 200. As a result, the use of a driver is avoided.

Another advantage to omitting a driver and instead accessing the hardware resource through the AML method 222 is that involvement in the hardware resource access by modules of the operating system 230 other than the ACPI subsystem 231 is minimized. Other than receiving the SCI interrupt 216 and scheduling the AML interpreter 232 to run in response, the operating system 230 is uninvolved with the hardware resource access.

When execution of the instructions of the AML method 222 in response to the SCI interrupt 216 is completed, execution of the AML interpreter 232 is terminated.

Figure 3:
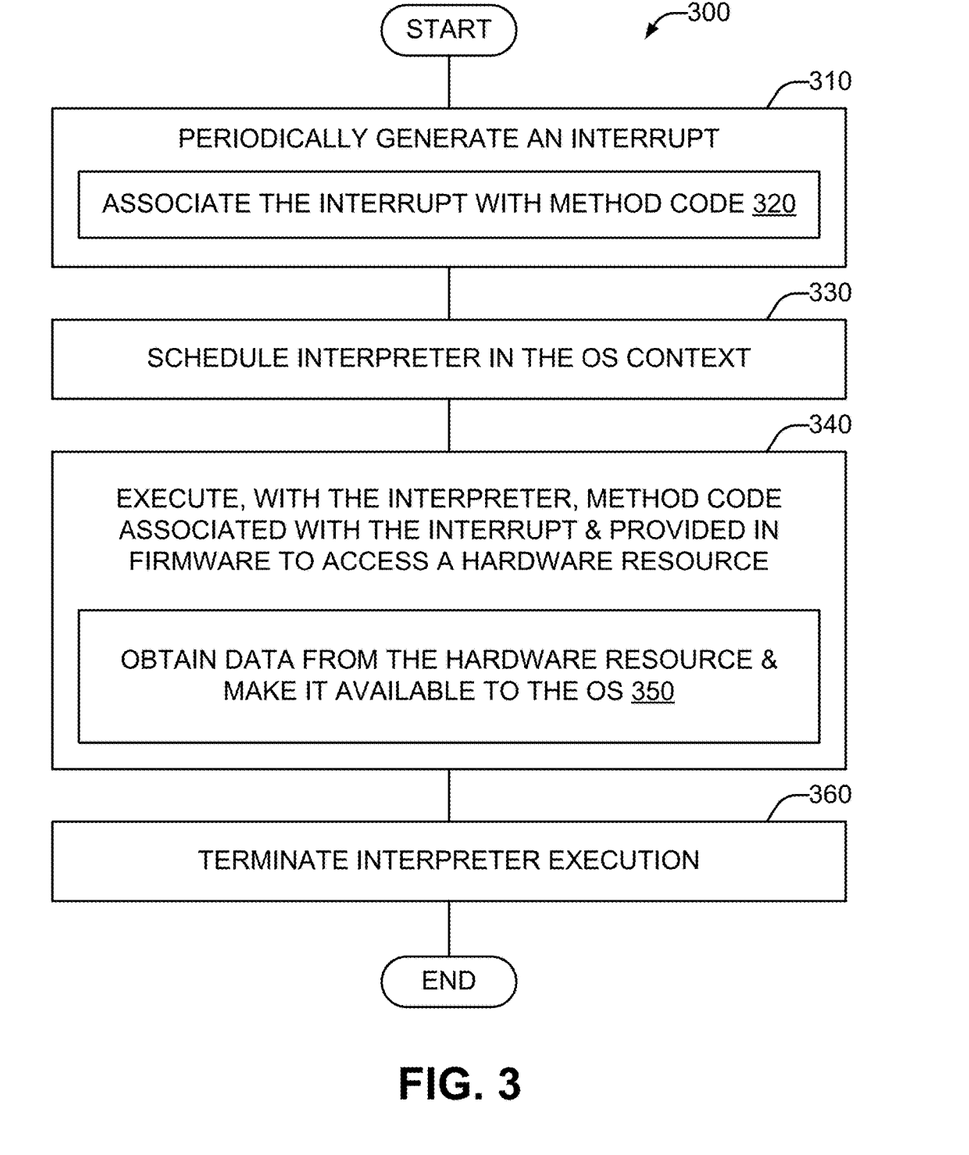
FIG. 3 is a flowchart according to an example of the present disclosure of a method for periodically accessing a hardware resource of a computer.

Considering now a method for periodically accessing a hardware resource of a computer from an operating system, and with reference to FIG. 3, a method 300 begins at 310 by periodically generating an interrupt. Alternatively, FIG. 3 can be considered to be a process performed in the computer 100 (FIG. 1) or 200 (FIG. 2). In some examples, the interrupt is generated by a hardware timer. In some examples, the timer is internal to the computer. In some examples, at 320, the interrupt is associated with particular method code instructions. At 330, in response to the interrupt, an interpreter that runs in the context of the operating system is scheduled to execute. At 340, method code instructions associated with the interrupt, and provided in firmware of the computer, are executed by the interpreter to access a hardware resource of the computer. In some examples, the operating system lacks a device driver for the hardware resource. In some examples, the executing 340 includes, at 350, obtaining data from the hardware resource concerning system operation, which may include system health or system performance data, and making it available to the operating system. At 360, execution of the interpreter is terminated after the interpreter has executed the method code instructions.

In some examples, the operating system implements the ACPI standard, and the method code is ACPI machine language (AML) instructions, the interpreter is an AML interpreter, and the interrupt is a System Control Interrupt (SCI), in accordance with the ACPI standard.

Figure 4:
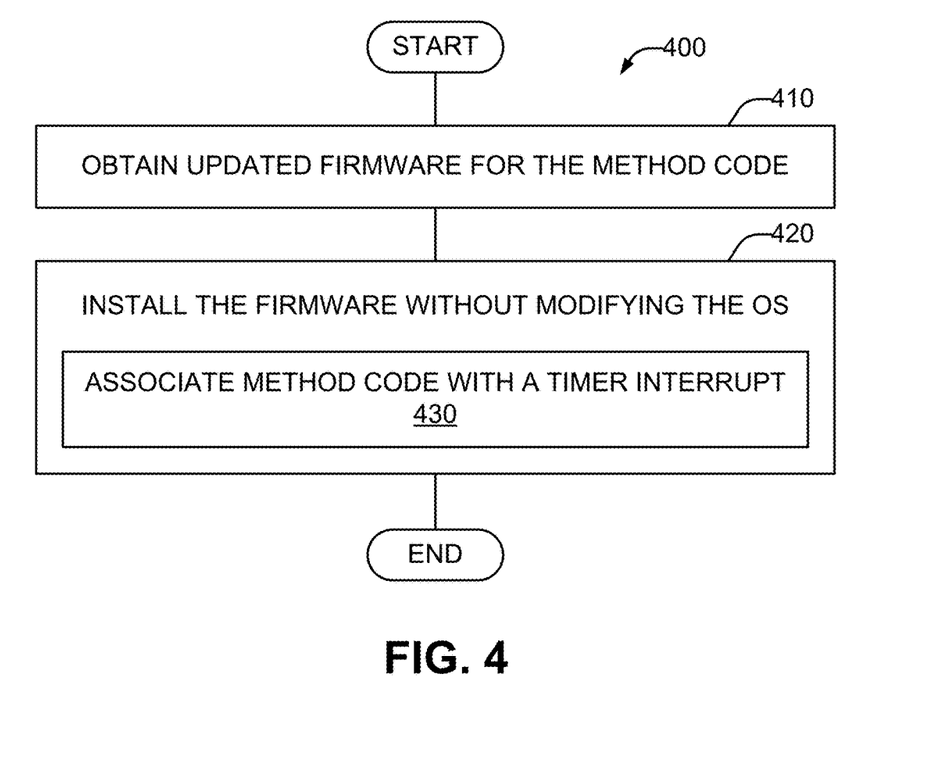
FIG. 4 is a flowchart according to an example of the present disclosure of a method for upgrading a computer for improved access to a hardware resource.

Considering now a method of upgrading a computer for improved access to a hardware resource, and with reference to FIG. 4, the method 400 may be used with the computer 100 (FIG. 1) or the computer 200 (FIG. 2). The method 400 begins at 410 by obtaining updated computer firmware that includes the method code instructions. In some examples, the computer stores the firmware in a flash memory whose contents can be programmatically updated in situ without physically replacing the flash memory device itself. In such examples, the updated firmware may be supplied in the form of a computer data file along with, or which can be used with, a program that programmatically modifies or replaces the contents of the flash memory with the contents of the data file. At 420, the updated firmware is installed in the computer without modifying any portion of the operating system of the computer. For example, the program is executed to update the firmware. In some examples, at 430, the installation includes associating particular method code of the updated firmware with a particular interrupt generated by a hardware timer.

Figure 5:
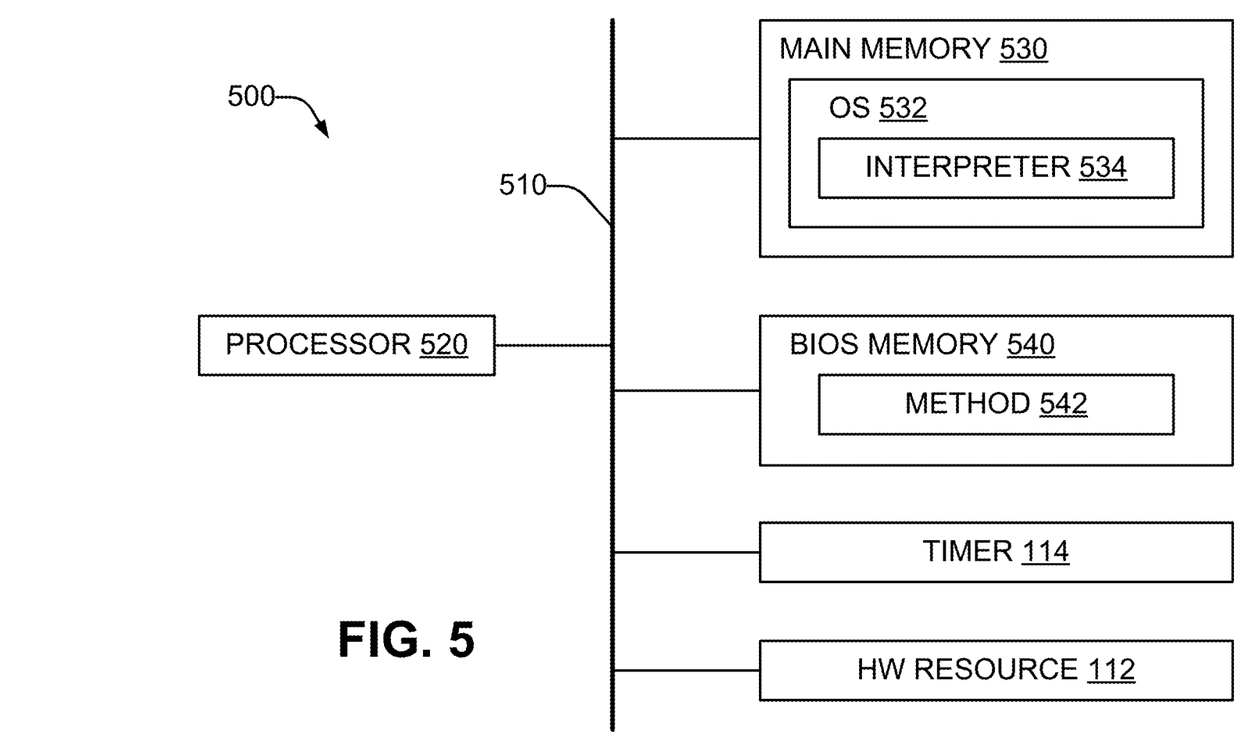
FIG. 5 is a schematic representation of a computer hardware architecture usable with the computer of FIG. 1 or FIG. 2 in accordance with an example of the present disclosure.

Considering now the hardware architecture 500 of a computer usable with the methods 300, 400, and with reference to FIG. 5, the architecture may be used in the computer 100 (FIG. 1) or 200 (FIG. 2). The components of the architecture 500 are interconnected via one or more busses 510. The architecture 500 includes the timer 114 and the hardware resource 112. The architecture also includes at least one processor 520, and a main memory 530. The main memory 530 is typically read-write memory, such as RAM. An operating system 532, including an interpreter 534, is loadable into the main memory 530. Typically the operating system 532 is loaded into the main memory 530 when the computer is booted, although in some applications in which the computer is embedded into a special-purpose electronic device, part or all of the operating system may be permanently loaded into the main memory 530. The operating system 532 may be the operating system 130 (FIG. 1) or 230 (FIG. 2), and the interpreter 534 may be the interpreter 132 (FIG. 1) or 232 (FIG. 2).

The architecture 500 also includes a BIOS memory 540. The BIOS memory 540 is a non-transitory, non-volatile computer-readable storage medium that retains its contents after power is removed. The BIOS memory 540 is typically flash memory that can be programmatically updated while resident in the computer. The BIOS memory 540 stores the BIOS firmware, such as the firmware 120 (FIG. 1) or 220 (FIG. 2), including the instructions of at least one method 542, which may be the method 122 (FIG. 1) or AML method 222 (FIG. 2). In operation, a method 542 may be copied into a portion of main memory 530. This portion may then be marked as ACPI memory, which makes it unusable for other purposes.

From the foregoing it will be appreciated that the computer, methods, and medium provided by the present disclosure represent a significant advance in the art. Although several specific examples have been described and illustrated, the disclosure is not limited to the specific methods, forms, or arrangements of parts so described and illustrated. For instance, examples of the disclosure are not limited to single-processor computer system, but is also applicable to multiple-processor systems. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method for periodically accessing a hardware resource of a computer, comprising:
    periodically generating an interrupt via a timer included in hardware internal to the computer, wherein the interrupt is 1) a System Control Interrupt (SCI) and 2) associated with particular Advanced Configuration and Power Interface (ACPI) machine language (AML) method code instructions that are 1) stored in firmware of the computer and 2) perform a function other than hardware configuration or power management;
    scheduling an interpreter that runs in a context of an operating system implementing an ACPI standard to execute in response to the interrupt;
    providing the particular method code instructions associated with the interrupt and stored in the firmware of the computer to the interpreter that runs in the context of the operating system; and
    executing, with the interpreter in the context of the operating system, the particular method code instructions, wherein the particular method code instructions, when executed, cause the interpreter executing in the context of the operating system to read data directly from the hardware resource of the computer and make the data available to the operating system exclusively based on the method code instructions and without using a device driver for the hardware resource.

2. The method of claim 1, wherein the hardware resource fails unless the hardware resource is periodically read, and wherein the periodic reading maintains proper functioning of the hardware resource.

3. The method of claim 1, wherein a chipset includes the timer.

4. The method of claim 1, wherein a discrete hardware element includes the timer.

5. A computer, comprising:
    a machine-readable medium to store firmware instructions, the firmware instructions comprising particular method code instructions that perform a function other than hardware configuration or power management;
    a timer, included in hardware, to periodically generate an interrupt, the interrupt is 1) a System Control Interrupt (SCI) and 2) is associated with the particular method code instructions stored in the firmware; and
    a processor to:
        execute an operating system,
        based on the interrupt, schedule an interpreter to execute in a context of the operating system implementing an ACPI standard,
        cause the interpreter to obtain the particular method code instructions stored in the firmware, and
        execute, with the interpreter in the context of the operating system, the particular method code instructions to obtain data directly from a hardware resource and make it available to the operating system exclusively based on the method code instructions and without use of a device driver for the hardware resource.

6. The computer of claim 5, wherein the hardware resource fails unless the hardware resource is periodically read, and wherein the periodic reading maintains proper functioning of the hardware resource.

7. A method of upgrading the computer of claim 5 for improved access to the hardware resource, comprising:
    obtaining updated computer firmware that includes the instructions; and
    installing the updated firmware in the computer without modifying any portion of the operating system.

8. A non-transitory computer-readable storage medium having an executable program stored thereon, wherein the executable program instructs a processor to:
    configure a timer independent of an operating system of a computer to periodically generate an interrupt to the operating system of the computer, the interrupt is 1) a System Control Interrupt (SC) and 2) associated with particular method code instructions that are 1) stored in firmware of the computer and 2) perform a function other than hardware configuration or power management;
    based on the interrupt, schedule an interpreter to execute in a context of the operating system implementing an ACPI standard;
    cause the interpreter executing in the context of the operating system to obtain the particular method code instructions stored in the firmware; and
    execute the particular method code instructions with the interpreter in the context of the operating system to read data directly from a hardware resource of the computer and make it available to the operating system exclusively based on the method code instructions and without using a device driver for the hardware resource.

9. The medium of claim 8, wherein the hardware resource fails unless the hardware resource is periodically read, and wherein the periodic reading maintains proper functioning of the hardware resource.

10. The medium of claim 8, wherein the executable program further instructs the processor to:
    access the hardware resource without communicating to the operating system any data related to the hardware resource access.

* * * * *

UNITED STATES PATENT AND TRADEMARK OFFICE
CERTIFICATE OF CORRECTION

| | |
|---|---|
| PATENT NO. | : 9,600,423 B2 |
| APPLICATION NO. | : 14/385258 |
| DATED | : March 21, 2017 |
| INVENTOR(S) | : Kimon Berlin et al. |

It is certified that error appears in the above-identified patent and that said Letters Patent is hereby corrected as shown below:

On the Title Page

In item (74), Name of the Attorney, in Column 2, Line 2, delete "Sismillich" and insert -- Sismilich --, therefor.

In the Claims

In Column 10, Line 39, in Claim 8, delete "(SC)" and insert -- (SCI) --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*